US012589511B2

(12) United States Patent
Douglas et al.

(10) Patent No.: US 12,589,511 B2
(45) Date of Patent: Mar. 31, 2026

(54) FOLDING KNIFE WITH REPLACEABLE BLADE

(71) Applicant: Good Sportsman Marketing, LLC, Irving, TX (US)

(72) Inventors: Dillon Douglas, Henderson, NV (US); Thomas Rucci, Henderson, NV (US); Howard Unger, Henderson, NV (US)

(73) Assignee: Good Sportsman Marketing, LLC, Irving, TX (US)

(*) Notice: Subject to any disclaimer, the term of this patent is extended or adjusted under 35 U.S.C. 154(b) by 327 days.

(21) Appl. No.: 18/197,818

(22) Filed: May 16, 2023

(65) Prior Publication Data

US 2023/0405852 A1 Dec. 21, 2023

Related U.S. Application Data

(60) Provisional application No. 63/352,628, filed on Jun. 15, 2022.

(51) Int. Cl.
*B26B 5/00* (2006.01)

(52) U.S. Cl.
CPC .................................... *B26B 5/00* (2013.01)

(58) Field of Classification Search
None
See application file for complete search history.

(56) References Cited

U.S. PATENT DOCUMENTS 1,087,342 A * 2/1914 Yerzley .................... B26B 5/00 30/157
3,488,843 A 1/1970 Tims
4,451,982 A 6/1984 Collins
5,737,841 A 4/1998 McHenry
6,058,611 A 5/2000 Rickard
6,145,202 A 11/2000 Onion
6,574,868 B1 6/2003 Overholt
6,751,868 B2 6/2004 Glesser
7,059,053 B2 6/2006 Sakai
7,340,837 B1 3/2008 Busse
7,716,839 B2 * 5/2010 Onion .................... B26B 1/044 30/156
7,900,363 B1 3/2011 White
7,941,927 B1 5/2011 Demko
D728,339 S 5/2015 Bloch
(Continued)

FOREIGN PATENT DOCUMENTS

CN 216803524 U * 6/2022
CN 220825963 U * 4/2024 ............... B26B 5/00
WO WO-2021092389 A1 * 5/2021 ............. B26B 1/042

OTHER PUBLICATIONS

English translation of CN-216803524-U, dated Jun. 24, 2022.*
English translaton of CN-220825963-U, dated Apr. 23, 2024.*

*Primary Examiner* — Hwei-Siu C Payer
(74) *Attorney, Agent, or Firm* — Cabello Hall Zinda, PLLC

(57) ABSTRACT

A folding knife with replaceable blade is movable between an extended state, a hyperextended state, and a folded state. A blade mounted to a holding assembly is replaceable when the folding knife is in the hyperextended state. The blade comprises a catch that requires a particular alignment, provided by the hyperextended state, to be inserted and removed. In this manner, the blade may not be removed from the holding assembly while in the folded and extended states.

20 Claims, 4 Drawing Sheets

(56) References Cited

U.S. PATENT DOCUMENTS

| | | | |
|---|---|---|---|
| D747,637 S | 1/2016 | Bloch | |
| D751,882 S | 3/2016 | Bloch | |
| D764,888 S | 8/2016 | Bloch | |
| 9,586,329 B2 | 3/2017 | Schuft | |
| 9,687,987 B2 | 6/2017 | Bloch | |
| D795,040 S | 8/2017 | Bloch | |
| 9,751,221 B1 | 9/2017 | Aylsworth | |
| 9,751,222 B2 | 9/2017 | Kao | |
| D806,498 S | 1/2018 | Bloch | |
| D806,499 S | 1/2018 | Bloch | |
| D807,143 S | 1/2018 | Constantine et al. | |
| 10,160,122 B2 | 12/2018 | Busse | |
| 10,307,916 B2 | 6/2019 | Hinderer | |
| D869,254 S | 12/2019 | Bloch | |
| 10,493,641 B2 | 12/2019 | Bloch | |
| 10,518,425 B2 | 12/2019 | Bloch | |
| 10,632,632 B1 | 4/2020 | Demko | |
| 10,792,823 B2 | 10/2020 | Busse | |
| D909,170 S | 2/2021 | Bloch | |
| D926,551 S | 8/2021 | Bloch | |
| 11,084,177 B2 | 8/2021 | Bloch | |
| 11,130,246 B2 | 9/2021 | Busse | |
| D938,253 S | 12/2021 | Chen | |
| D941,654 S | 1/2022 | Chen | |
| 11,220,013 B1 | 1/2022 | Valerio | |
| 11,298,837 B2 | 4/2022 | Hangartner | |
| 11,305,440 B2 | 4/2022 | Demko | |
| D1,032,321 S | 6/2024 | Cavanaugh, Jr. | |
| D1,033,193 S | 7/2024 | Cavanaugh, Jr. | |
| 12,090,618 B1 * | 9/2024 | Feng | B25F 1/04 |
| 2005/0252010 A1 | 11/2005 | Freeman | |
| 2007/0169353 A1 | 7/2007 | Wu | |
| 2008/0040931 A1 | 2/2008 | Demko | |
| 2010/0192381 A1 | 8/2010 | Sakai | |
| 2010/0299935 A1 | 12/2010 | Ping | |
| 2011/0167647 A1 | 7/2011 | Gringer | |
| 2014/0216605 A1 | 8/2014 | Batty | |
| 2015/0239134 A1 | 8/2015 | Duey | |
| 2016/0121493 A1 | 5/2016 | Ikoma | |
| 2016/0271809 A1 | 9/2016 | Bloch et al. | |
| 2016/0354936 A1 | 12/2016 | Busse | |
| 2017/0348863 A1 | 12/2017 | Kommer et al. | |
| 2019/0217489 A1 | 7/2019 | Cheng | |
| 2021/0402625 A1 * | 12/2021 | Bloch | B26B 5/00 |
| 2022/0297322 A1 | 9/2022 | Douglas | |
| 2022/0339805 A1 | 10/2022 | Kao | |
| 2022/0410415 A1 | 12/2022 | Douglas et al. | |

* cited by examiner

FOLDING KNIFE WITH REPLACEABLE BLADE

CROSS-REFERENCE TO RELATED APPLICATION

This application claims the benefit of U.S. Provisional Patent Application No. 63/352,628, filed Jun. 15, 2022.

BACKGROUND OF THE INVENTION

1. Field of the Invention

The invention relates to foldable knives and in particular to a folding knife with a replaceable blade.

2. Related Art

Folding knives are often desired because they include a blade that can be extended for use and then folded for storage or when carrying the knife. Rather than sharpening a blade, some folding knives include a replaceable blade such that new blades can replace old or worn blades.

From the discussion that follows, it will become apparent that the present invention addresses the deficiencies associated with the prior art while providing numerous additional advantages and benefits not contemplated or possible with prior art constructions.

SUMMARY OF THE INVENTION

A folding knife with replaceable blade is disclosed herein. As will be disclosed herein, the folding knife has an extended state where its blade is extended for use and a folded state, such as for storage or transport. In addition, a distinct hyperextended state is provided for replacing the blade.

Various embodiments of the folding knife are disclosed herein. For example, in one embodiment a folding knife comprises a handle, a mount, and a holding assembly. The mount is cylindrical except for at least one planar section, and the holding assembly is rotatably mounted to the handle such that the holding assembly is rotatable between an extended position, a hyperextended position, and a folded position.

A blade is mounted to the holding assembly. The blade has a catch comprising a narrowed passage terminating in a circular portion. The mount is received within the catch when the blade is mounted to the holding assembly. The mount may be mounted in an opening of the handle. The opening has a circular shape except for at least one planar section corresponding to the at least one planar section of the mount.

The narrowed passage and the at least one planar section are in alignment when the holding assembly is in the hyperextended position and are not in alignment when the holding assembly is in the extended position or the folded position. The mount is removable from the catch when the narrowed passage and the at least one planar section are in alignment and is not removable from the catch when the narrowed passage and the at least one planar section are not in alignment.

It is noted that a locking bar may be provided that engages one or more notched portions of the holding assembly. One or more biasing devices may engage the locking bar to bias the locking bar toward a particular position. The holding assembly may include one or more plates that engage the blade when the blade is mounted to the holding assembly.

The blade may comprise an anchor at a distal portion of the blade. The anchor engages the holding assembly when the blade is mounted to the holding assembly. The anchor may be angled substantially similarly to an angle of the narrowed passage.

In another exemplary embodiment, a folding knife may comprise a handle and a removable blade that is rotatable between at least a first position and a second position. A catch is provided at one end of the blade. The catch has a narrowed passage terminating in a circular portion. A mount having a cylindrical shape except for at least one substantially planar section is also included. The mount is received within the catch when the removable blade is mounted to the folding knife.

The narrowed passage and the at least one substantially planar section are in alignment when the removable blade is in the second position and are not in alignment when the removable blade is not in the second position. The mount is removable from the catch when the narrowed passage and the at least one substantially planar section are in alignment but not removable from the catch when the narrowed passage and the at least one substantially planar section are not in alignment.

The mount may be mounted in an opening of the handle having a circular shape except for at least one substantially planar section corresponding to the at least one substantially planar section of the mount.

It is noted that the blade may be rotatable when the mount is received within the circular portion of the catch, and may not be rotatable when the mount is within the narrowed passage of the catch. Similar to above, a locking bar that engages one or more notched portions at the removable blade may be provided.

The blade may include an anchor at a distal portion of the blade. The anchor engages the holding assembly when the blade is mounted to the holding assembly. The anchor may be angled substantially similarly to an angle of the narrowed passage.

Various related methods are also disclosed herein. For instance, in one exemplary method, a folding knife having a handle and a removable blade is provided, the method comprising providing a catch comprising a narrowed passage terminating in a circular portion at a proximal portion of the removable blade, providing a mount having a cylindrical structure except for at least one substantially planar section, and rotatably mounting the removable blade by receiving the mount in the circular potion of the catch. The removable blade is rotatable between at least a first position and a second position. The mount is fixed relative to the handle.

The narrowed passage and the at least one substantially planar section are in alignment when the removable blade is in the second position and are not in alignment when the removable blade is not in the second position. The mount is removable from the catch when the narrowed passage and the at least one substantially planar section are in alignment and is not removable from the catch when the narrowed passage and the at least one substantially planar section are not in alignment.

A locking bar that engages one or more notched portions at the removable blade may be provided, similar to above. One or more biasing devices may engage the locking bar as well. The blade may comprise an anchor at a distal portion of the blade, with the anchor engaging the holding assembly when the blade is mounted to the holding assembly. The anchor may be angled substantially similarly to an angle of the narrowed passage.

The mount may be fixed relative to the handle via an opening of the handle. Such opening may have a circular shape except for at least one substantially planar section corresponding to the at least one substantially planar section of the mount.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The folding knife herein comprises a replaceable blade and, as such, provides the benefits of a folding knife while also allowing blades to be replaced. This allows worn or used blades to be replaced with new blades thereby maintaining the cutting capability of the folding knife over time. As will be disclosed herein, the folding knife folds when not in use, extends for use, and hyperextends for blade replacement.

Hyperextending the folding knife releases the blade, which is otherwise securely held by the folding knife. In this manner, the hyperextended state distinctly identifies a blade replacement mode of the folding knife to users whereby the blade can be replaced. As such, an extended state and folded state can be identified by users as being for other purposes, such as use, storage, and transport of the folding knife.

Figure 1:
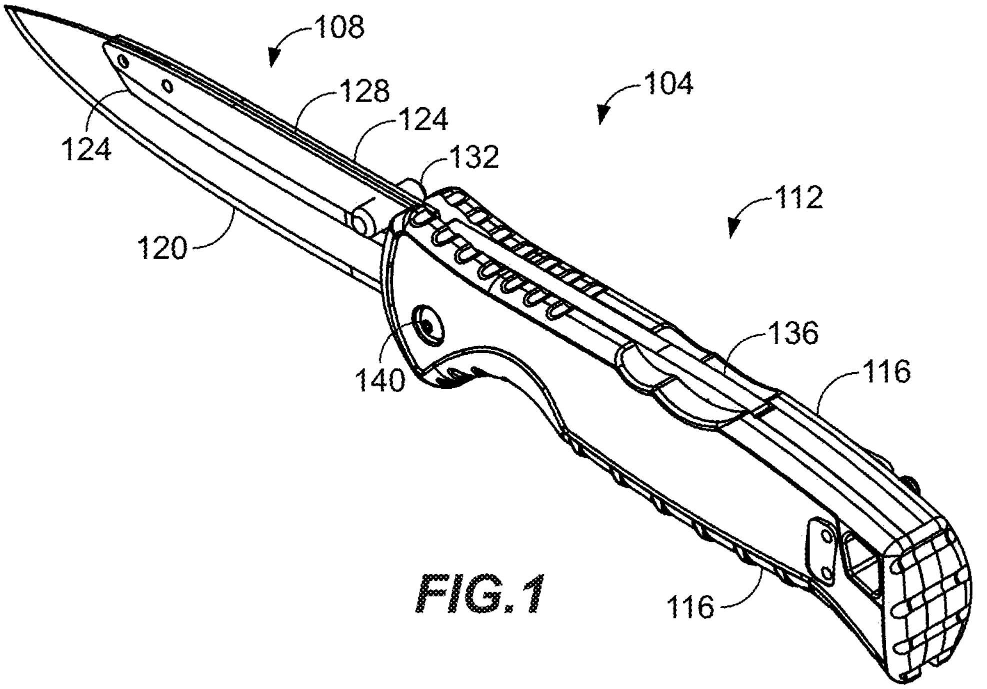
FIG. 1 is a perspective view of an exemplary folding knife with replaceable blade.
Figure 2:
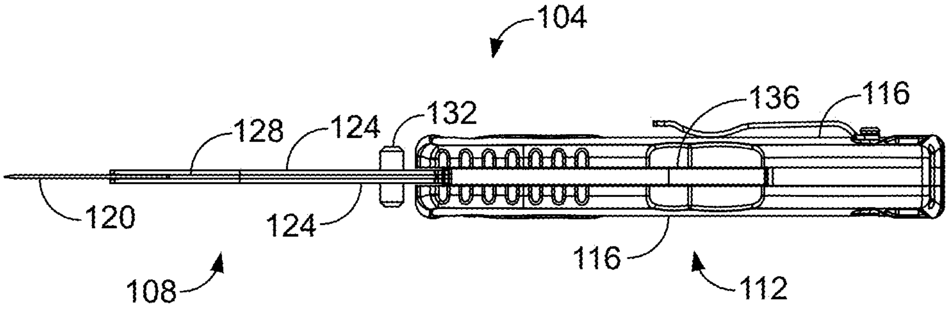
FIG. 2 is a top view of an exemplary folding knife with replaceable blade.
Figure 3:
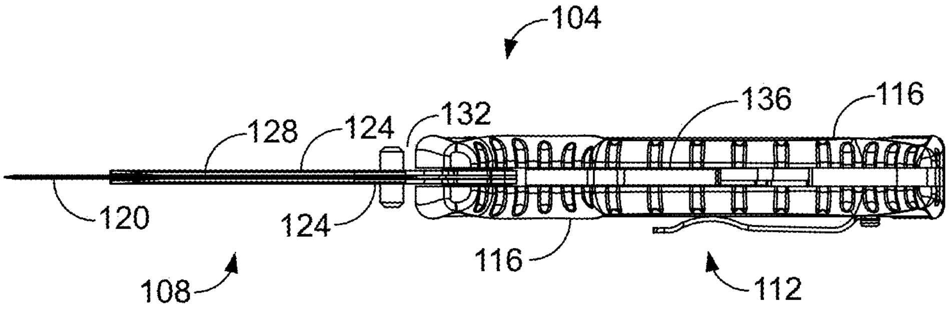
FIG. 3 is a bottom view of an exemplary folding knife with replaceable blade.

FIGS. 1-3 illustrate an exemplary folding knife 104 in an extended state. FIG. 1 illustrates a perspective view while FIGS. 2 and 3 respectively illustrate top and bottom views. As can be seen, a folding knife 104 may comprise a holding assembly 108 that holds a blade 120. A holding assembly 108 may comprise a slot that receives a blade.

As shown in FIG. 1 for example, a holding assembly 108 may comprise one or more plates 124 spaced apart by a spacer 128 to receive a blade 120 therebetween. One or more studs 132 may extend outward to allow a holding assembly 108 to be more readily operated by a user.

A folding knife 104 will typically also include a locking assembly 112 comprising a locking bar 136 for locking the folding knife in various states. As will be described further below, a locking bar 136 may be actuated to permit rotation of a holding assembly 108, such as to transition a folding knife 104 between folded, extended, and hyperextended states, or various subsets thereof.

A handle 116 for grasping the folding knife 104 will typically also be provided. One or more components of a folding knife 104 may be housed within and supported by a handle 116 as well. One or more fasteners 140, such as screws, pins, or the like may be used to assemble or otherwise mount various components of a folding knife 104.

Figure 4:
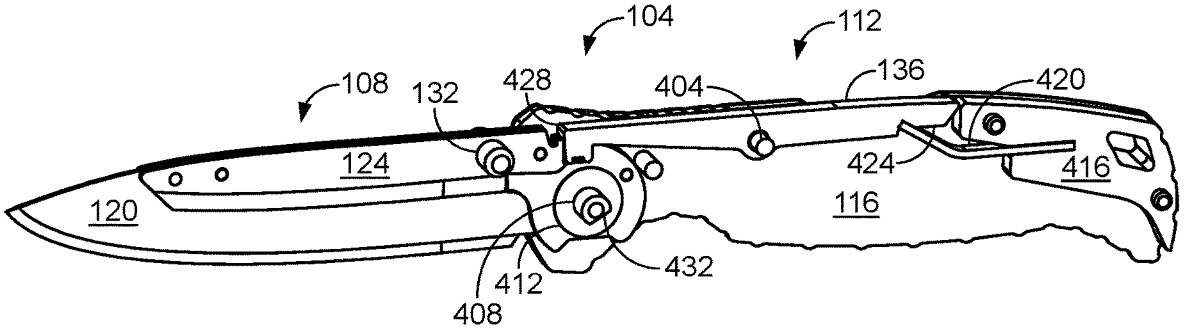
FIG. 4 is a side perspective view of an exemplary folding knife with replaceable blade.

FIG. 4 illustrates a side perspective view of a folding knife 104 with a side of its handle 116 removed to show the internal components of the folding knife. As can be seen, a rotatable mount 408 may be provided to rotatably attach a holding assembly 108 to the remainder of a folding knife 104. In the embodiment of FIG. 4, the rotatable mount 408 extends between opposing sides of a handle 116, with the holding assembly 108 being rotatably mounted to the rotatable mount 408. One or more washers 412 may be provided as bushings, spacers, or both in one or more embodiments, such as to refine the rotational movement of a holding assembly 108.

In one or more embodiments, a rotatable mount 408 may be a cylindrical shape with one or more flat or otherwise planar portions 432 such that the rotatable mount is not entirely cylindrical. As will be described further below, this facilitates retention and removal of a blade 120 across the various states of the folding knife 104.

A locking assembly 112 may comprise, in addition to a locking bar 136, a pivot 404 or other rotatable mount for rotatably mounting the locking bar. In this manner, the locking bar 136 may be actuated by a user to permit a folding knife 104 to be placed in different states. Referring to FIGS. 1 and 2 for example, a user may depress or otherwise actuate an externally accessible portion of a locking bar 136 to engage and disengage a locking end 428 of a locking bar 136 thereby allowing a folding knife 104 to transition between states.

One or more biasing devices 420 may be provided to bias a locking bar 136 to a particular position. As can be seen from the embodiment of FIG. 4 for instance, the biasing device 420 may be a flat spring applying a force to push a lever end 424 of the locking bar 136 toward the outer periphery of the handle 116. A biasing device 420 may be secured at a first section to a handle 116, such as via a mount 416, and will typically engage a lever end 424 of a locking bar 136 at a second section.

Figure 5:
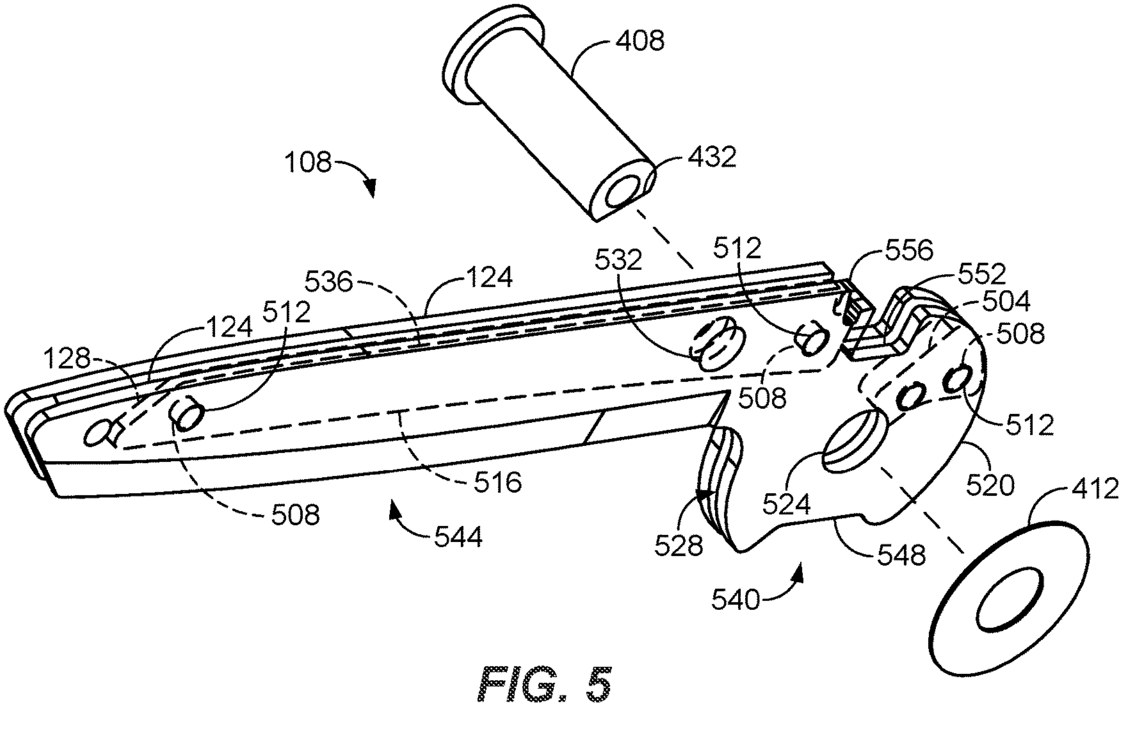
FIG. 5 is a perspective view of an exemplary holding assembly.

FIG. 5 illustrates a perspective view of an exemplary holding assembly 108 along with a rotatable mount 408 and washer 412 in exploded fashion. A holding assembly 108 may comprise a hub portion 540 with an outward extending portion 544 extending from the hub portion. A through hole 524 may be formed in a holding assembly 108, such as at one or more plates 124 thereof, to receive a rotatable mount 408 and thereby rotatably mount the holding assembly. In one or more embodiments, a holding assembly 108 will be rotatably mounted at its hub portion 540. It is noted that each plate 124 may have the same shape in one or more embodiments.

As discussed above, a holding assembly 108 may comprise one or more plates 124 spaced apart with a spacer 128 to create a slot or space 528 therebetween for receiving a blade. As can be seen, a spacer 128 may be at an extending portion 544 of a holding assembly 108.

A spacer 128 may comprise an external edge 536 and an internal edge 516. The external edge 536 is spaced apart from the upper edge of each plate 124, while the lower edge 516 may be shaped to correspond to the shape of a blade. As shown in FIG. 5 for example, the lower edge 516 can be curved to correspond to the curve of the top edge 624 on the blade 120 as in FIG. 6.

A spacer 128 may be attached to one or more plates 124, such as with one or more mechanical or other fasteners, or formed integrally therewith. As shown in the embodiment of FIG. 5 one or more tabs 508 may extend into corresponding openings 512 to secure a spacer 128 to a plate 124. An aperture 532 may be provided in some embodiments to receive and secure a stud.

A blade mount 504 may be attached to one or more plates 124 as well. As shown in FIG. 5 for example, a blade mount 504 may be at the space 528 between the plates 124 at a hub portion 540 of the holding assembly 108. A blade mount 504 may be shaped to engage a portion of a blade to releasably secure a blade, as will be described further below.

Similar to above, a blade mount 504 may be attached to one or more plates 124 with one or more mechanical or other fasteners, or be formed integrally therewith. For instance, a blade mount 504 may be secured by one or more tabs 508 that extend into one or more corresponding openings 512.

A hub portion 540 will typically have a shaped peripheral edge 520. As can be seen from FIG. 5 for example, each plate 124 has a generally circular or otherwise arcuate shaped peripheral edge 520. One or more notched portions 548, 552, 556 may be provided along the shaped peripheral edge 520 that, in combination with a locking assembly, allow a folding knife to maintain its various states, as will be described further below.

Figure 6:
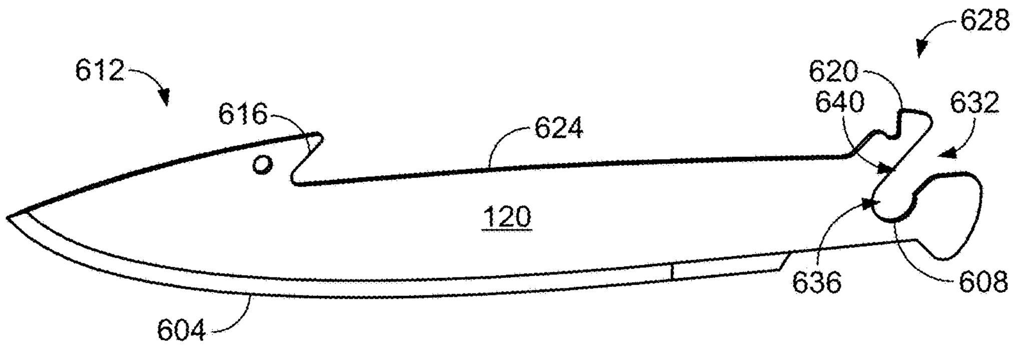
FIG. 6 is a side perspective view of an exemplary blade.

FIG. 6 illustrates a side perspective view of an exemplary blade 120. As can be seen, a blade 120 may comprise a cutting edge 604 with a top edge 624 generally opposite the cutting edge. In one or more embodiments, a top edge 624 may at least partially or substantially conform to the shape of a spacer, or vice versa, to engage with the spacer along its length when the blade 120 is installed and in use. A blade 120 may also comprise one or more notched portions 620 having similar or the same shape as corresponding notched portions of a holding assembly.

A blade 120 will typically also comprise an anchor 616 that generally secures a distal portion 612 of the blade when installed. A catch 608 may be at a proximal portion 628 of a blade 120 and may generally secure the proximal portion of the blade.

As can be seen, a catch 608 may comprise a slot or other opening 632 that receives a blade mount of a holding assembly. In one or more embodiments, a catch 608 may have a flared opening 632 that terminates in a circular compartment 636 with a narrowed passage 640 therebetween. A circular compartment 636 may generally corresponding to an outer dimension of a rotatable mount to receive and retain a rotatable mount. In one or more embodiments, a narrowed passage 640 may be narrower than a circular compartment 636, allowing a rotating mount to be retained therein unless rotated to align with the narrowed passage.

Figure 7:
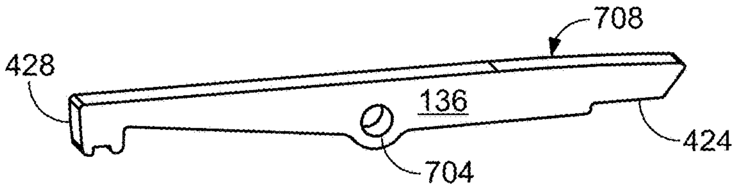
FIG. 7 is a side perspective view of an exemplary locking bar.

FIG. 7 illustrates a side perspective view of an exemplary locking bar 136. As can be seen, a through hole 704 may be provided to rotatably mount a locking bar 136, such as via a pivot 404 in FIG. 8. In addition, it can be seen that a lever end 424 may comprise a stepped or other shaped portion to engage a biasing device, while a locking end 428 may comprise one or more hooks, tabs, or other protrusions that engage a holding assembly to lock or hold a folding knife in a particular state.

A user engagement portion 708 may be provided as well to allow a user to actuate the locking bar 136. As can be seen, a user engagement portion 708 may be part of an edge of a locking bar 136. In one or more embodiments, a user engagement portion 708 may be textured or the like, such as to form a grip if desired.

Figure 8:
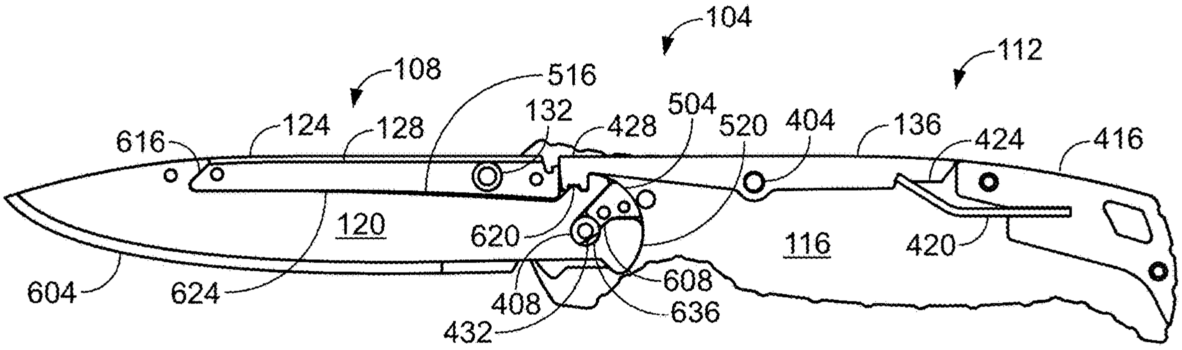
FIG. 8 is a side view of an exemplary folding knife with replaceable blade in an extended state.
Figure 9:
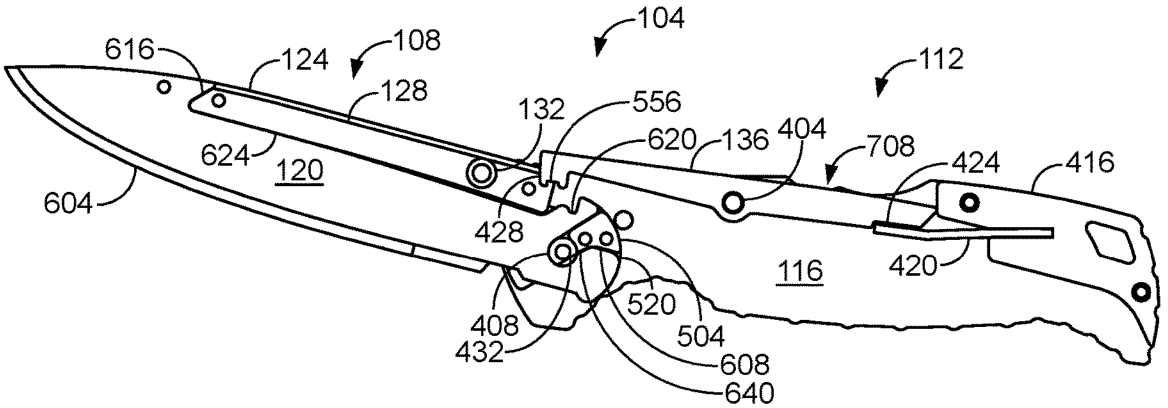
FIG. 9 is a side view of an exemplary folding knife with replaceable blade in a hyperextended state.
Figure 10:
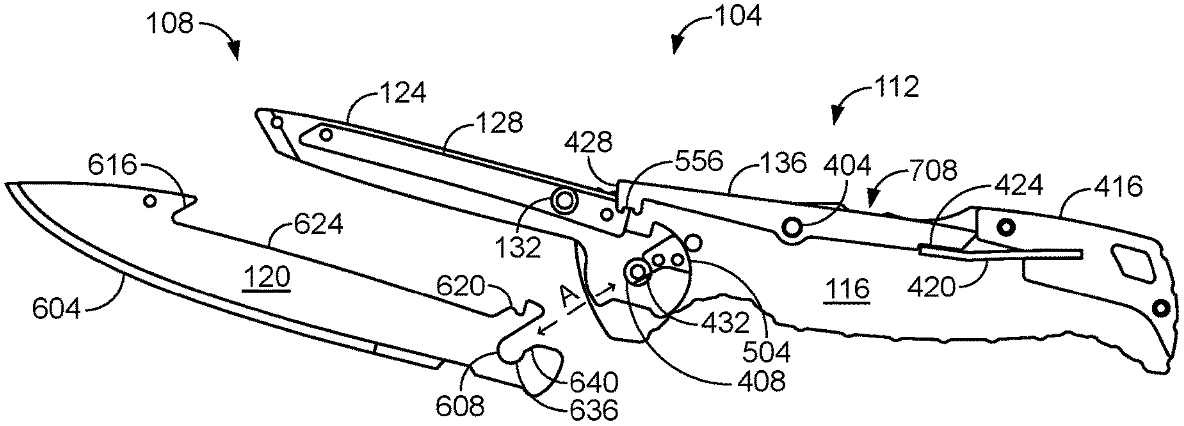
FIG. 10 is a side view of an exemplary folding knife illustrating blade replacement.
Figure 11:
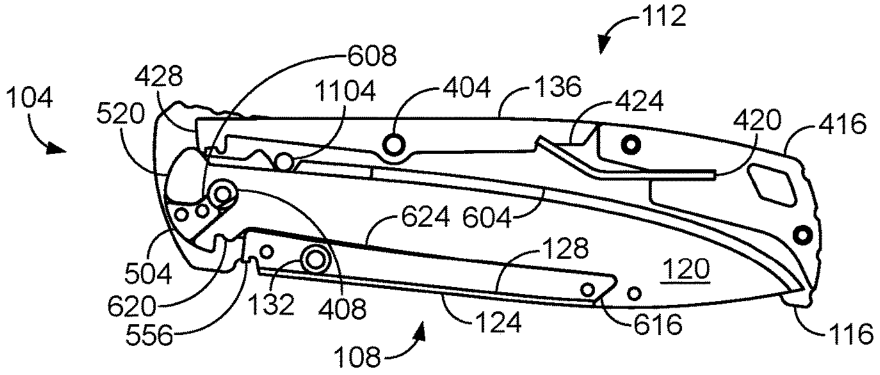
FIG. 11 is a side view of an exemplary folding knife with replaceable blade in a folded state.

Operation of a folding knife 104 will now be described with respect to FIGS. 8-11. FIG. 8 illustrates the folding knife 104 in an extended state and FIGS. 9 and 10 illustrate the folding knife 104 in a hyperextended state where a blade 120 may be replaced while FIG. 11 illustrates the folding knife in a folded state. In FIGS. 8-11 a side of the handle 116 and a plate 124 are not shown so as to reveal the interior of the folding knife 104 for disclosure purposes.

Referring to FIG. 8, it can be seen that the folding knife 104 is in an extended state whereby the holding assembly 108 and blade 120 are extended for use and locked in this extended position. As can be seen, a locking end 428 of the locking bar 136 engages a corresponding portion of the holding assembly 108, namely, a notched portion 620 of the blade's shaped peripheral edge 520 to lock the folding knife 104 in the extended position. A biasing device 420 applies force to the locking bar 136 thereby maintaining engagement of the locking end 428 and notched portion 620.

A blade 120 may be secured by engaging its anchor 616 to a corresponding portion of a spacer 128 as can be seen. In addition, a blade 120 may engage a blade mount 504 of the holding assembly 108 via its catch 608. As shown for example, a flared portion of the catch 608 receives a correspondingly flared blade mount 504. It is noted that the corresponding shapes engage one another allowing rotation of the blade 120 to rotate the holding assembly 108 and vice versa.

In an extended state, the blade 120 cannot typically be removed. As can be seen, the flared blade mount 504 and catch 608 restrict movement of the blade relative to the holding assembly 108 and the blade cannot be disengaged from the blade mount 504 due to the engagement of the locking bar 136.

In addition, even when the locking bar 136 is disengaged, the blade 120 will typically remain non-removable in the various embodiments of the folding knife 104. Referring also to FIG. 6, a narrowed passage 640 of a catch 608 and planar portion 432 of a rotatable mount 408 permit the rotatable mount to travel into the circular portion 636 of a catch only at one or more particular angles. As such, as can be seen in FIG. 8, in the extended state, the rotatable mount 408 is within the circular portion 636 at an angle in which the rotatable mount cannot be removed from the catch 608.

Referring to FIG. 9, the locking bar 136 may be actuated, such as by depressing a user engagement portion 708 thereof, to unlock the holding assembly 108 to permit rotation of the holding assembly and blade 120. This distorts the biasing device 420 as well as force is applied thereto.

As can be seen, the locking bar 136 has disengaged the shaped peripheral edge 520 of the holding assembly 108. More specifically, the locking end 428 of the locking bar 136 has disengaged from the notched portion 620 of the blade 120. Accordingly, the holding assembly 108 and blade 120 are now rotatable and, in FIG. 9, have been rotated beyond the extended state such that the folding knife is in a hyperextended state.

As will now be described, in a hyperextended state, the holding assembly 108 and blade 120 are positioned such that the blade can be removed from the holding assembly. Referring to FIGS. 9 and 10, it can be seen that, in the hyperextended state, the holding assembly 108 and blade 120 are at a hyperextended position whereby the planar portion 432 of the rotatable mount 408 and narrowed passage 640 of the catch 608 are in alignment. As such, the rotatable mount 408 may be removed from the circular portion or compartment 636 of the catch 608. As shown in FIG. 10 for example, it can be seen that the blade 120 may be completely removed along path A which accordingly removes the rotatable mount 408 from the catch 608.

In addition, a new blade 120 may be installed along path A while the folding knife 104 is in a hyperextended state. This may occur by moving a blade 120 such that a rotatable mount 408 is received in a catch 608 and ultimately seated in a circular portion or compartment 636 of the catch, such as shown in FIG. 9. As shown in the embodiment of FIG. 10, a blade 120 must be maintained at a proper angle to allow a rotatable mount 408 to enter through a narrowed passage 640 and seat within a circular portion 636 of a catch 608.

It is noted that, in one or more embodiments, a locking bar 136 may lock a folding knife in a hyperextended state. As shown for example, a locking end 428 of a locking bar 136 may engage another notched portion 556 of a holding assembly 108 to hold the folding knife 104 in a hyperextended state.

Once a blade 120 has been installed, such as in FIG. 9, the folding knife 104 may be transitioned to other states. For instance, the folding knife 104 may be placed in an extended state as shown in FIG. 8, or a folded state as shown in FIG. 11, as will now be described.

Referring to FIG. 11, it can be seen that a holding assembly 108 and blade 120 may be rotated to place the folding knife 104 in a folded state where the holding assembly and blade are in a folded position such that they are substantially within a handle 116 of the folding knife. In one or more embodiments, a holding assembly 108 and blade 120 may be folded until engagement with a stop 1104 occurs. As shown in FIG. 11 for example, a portion of a blade 120 may engage a stop 1104 when in the folded state.

In a folded state, a locking bar 136 may engage a portion of a shaped peripheral edge 520 of a holding assembly 108. Such engagement may hold a holding assembly 108 and blade 120 in position such that a folding knife 104 does not inadvertently leave a folded state. Such holding engagement also differs from a locked state in that the engagement may be overcome by a user rotating the holding assembly, such as via a stud 132, without directly actuating a locking assembly 112 or locking bar 136 thereof.

As can be seen, a shaped peripheral edge 520 may comprise one or more arcuate portions that may be smooth along their lengths, allowing rotation of a holding assembly 108 to continue unencumbered and actuate the locking bar 136 as the locking bar's locking end 428 travels along the shaped peripheral edge as rotation occurs.

A locking bar 136 may travel along a shaped peripheral edge 520 until another state is reached. For example, a locking bar 136 may travel until a notched portion 620 is engaged, such as in the extended state shown in FIG. 8. From such state, the folding knife 104 may be transitioned to various other states as described herein, such as by actuating a locking assembly 112, rotating a holding assembly 112, or both.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A folding knife comprising:

a handle having a mount, the mount being cylindrical except for at least one planar section;

a holding assembly rotatably mounted to the handle, wherein the holding assembly is rotatable between an extended position, a hyperextended position, and a folded position; and a blade mounted to the holding assembly, the blade having a catch comprising a narrowed passage terminating in a circular portion, the mount received within the catch when the blade is mounted to the holding assembly, wherein the narrowed passage and the at least one planar section are in alignment when the holding assembly is in the hyperextended position and are not in alignment when the holding assembly is in the extended position or the folded position, the mount being removable from the catch when the narrowed passage and the at least one planar section are in alignment and not being removable from the catch when the narrowed passage and the at least one planar section are not in alignment.

2. The folding knife of claim 1, further comprising a locking bar that engages one or more notched portions of the holding assembly.

3. The folding knife of claim 2, further comprising one or more biasing devices that engage the locking bar.

4. The folding knife of claim 1, wherein the holding assembly comprises one or more plates that engage the blade when the blade is mounted to the holding assembly.

5. The folding knife of claim 1, wherein the blade comprises an anchor at a distal portion of the blade, the anchor engaging the holding assembly when the blade is mounted to the holding assembly.

6. The folding knife of claim 5, wherein the anchor defines a first angle corresponding to a second angle of the narrowed passage.

7. The folding knife of claim 1, wherein the mount is mounted in an opening of the handle, the opening having a circular shape except for at least one planar section corresponding to the at least one planar section of the mount.

8. A folding knife comprising:

a handle;

a removable blade comprising a catch at one end, the catch comprising a narrowed passage terminating in a circular portion, the removable blade being rotatable between one or more first positions and a hyperextended position; and a mount having a cylindrical shape except for at least one substantially planar section, the mount received within the catch when the removable blade is mounted to the folding knife, wherein the narrowed passage and the at least one substantially planar section are in alignment when the removable blade is in the hyperextended position and are not in alignment when the removable blade is not in the hyperextended position, the mount being removable from the catch when the narrowed passage and the at least one substantially planar section are in alignment and not being removable from the catch when the narrowed passage and the at least one substantially planar section are not in alignment.

9. The folding knife of claim 8, wherein the removable blade is rotatable when the mount is received within the circular portion of the catch.

10. The folding knife of claim 9, wherein the removable blade is not rotatable when the mount is within the narrowed passage of the catch.

11. The folding knife of claim 8, further comprising a locking bar that engages one or more notched portions at the removable blade.

12. The folding knife of claim 8, further comprising a holding assembly rotatably mounted to the handle via the mount, wherein an anchor of the removable blade engages the holding assembly.

13. The folding knife of claim 12, wherein the anchor defines a first angle corresponding to a second angle of the narrowed passage.

14. The folding knife of claim 8, wherein the mount is mounted in an opening of the handle, the opening having a circular shape except for at least one substantially planar section corresponding to the at least one substantially planar section of the mount.

15. A method for providing a folding knife having a handle and a removable blade, the method comprising:

providing a catch comprising a narrowed passage terminating in a circular portion at a proximal portion of the removable blade;

providing a mount having a cylindrical structure except for at least one substantially planar section, the mount being fixed relative to the handle; and rotatably mounting the removable blade by receiving the mount in the circular potion of the catch, the removable blade being rotatable between one or more first positions and a hyperextended position, wherein the narrowed passage and the at least one substantially planar section are in alignment when the removable blade is in the hyperextended position and are not in alignment when the removable blade is not in the hyperextended position, the mount being removable from the catch when the narrowed passage and the at least one substantially planar section are in alignment and not being removable from the catch when the narrowed passage and the at least one substantially planar section are not in alignment.

16. The method of claim 15, further comprising providing a locking bar that engages one or more notched portions at the removable blade.

17. The method of claim 16, further comprising providing one or more biasing devices that engage the locking bar.

18. The method of claim 15, further comprising rotatably mounting a holding assembly to the handle via the mount, wherein an anchor of the removable blade engages the holding assembly.

19. The method of claim 18, wherein the anchor defines a first angle corresponding to a second angle of the narrowed passage.

20. The method of claim 15, wherein the mount is fixed relative to the handle in an opening of the handle, the opening having a circular shape except for at least one substantially planar section corresponding to the at least one substantially planar section of the mount.

* * * * *